United States Patent

Dowling

[11] 4,057,805
[45] Nov. 8, 1977

[54] RADIO-CONTROLLED MACHINE POWER CUT-OFF

[75] Inventor: Donald Hugh Dowling, Newark, Del.

[73] Assignee: E. I. Du Pont de Nemours and Company, Wilmington, Del.

[21] Appl. No.: 672,030

[22] Filed: Mar. 30, 1976

[51] Int. Cl.$^2$ .............................................. H04B 7/00
[52] U.S. Cl. ................................ 343/225; 192/129 A; 325/37; 325/118; 340/147 MT; 340/267 R; 340/279
[58] Field of Search ................ 343/225; 340/147 MT, 340/224, 119, 267 R, 279; 192/131 R, 129 A; 318/16; 325/37, 51, 118

[56] References Cited

U.S. PATENT DOCUMENTS

| | | |
|---|---|---|
| 2,913,581 | 11/1959 | Simonton et al. ................ 192/129 A |
| 2,963,627 | 12/1960 | Buchsbaum .......................... 343/225 |
| 3,950,755 | 4/1976 | Westbrook, Sr. ..................... 343/225 |

*Primary Examiner*—Glen R. Swann, III

[57] ABSTRACT

A pair of battery-powered radio transmitters are individually worn on the wrists of a machine operator, and two radio receivers are tuned to receive the signals broadcast by the radio transmitters, the first radio receiver being a proximity-sensitive device switching off the driving power to the machine whenever either radio transmitter comes within a preselected safe distance limit from the work-accomplishing region of the machine whereas the second radio receiver is a radio transmitter operating state-verifying device switching off the driving power to the machine whenever either or both of the radio transmitters fails to transmit its characteristic broadcast signal.

6 Claims, 20 Drawing Figures

Fig. 9A. Wave Forms

Fig. 9B. Scope Display

Fig. 10.

Fig. 11.
Two-Tone Receiver Selectivity Characteristics

RADIO-CONTROLLED MACHINE POWER CUT-OFF

BRIEF SUMMARY OF THE INVENTION

Generally, this invention is a radio-controlled machine safety power cut-off comprising a pair of battery-powered radio transmitters adapted for individual wear on the wrists of the machine operator, a first radio receiver means having its antenna disposed near the operation-performing region of the machine responsive to the predetermined magnitude of a broadcast signal emitted by the radio transmitters singly or collectively signalling intrusion of a radio transmitter closer than a predetermined safe distance into the operation-performing region of the machine cutting off the operating power of the machine, and a second radio receiver means having its antenna disposed adjacent the machine responsive to the broadcast signals of the pair of radio transmitters cutting off the operating power to the machine whenever either or both of the radio transmitters fails to emit broadcast signals.

BACKGROUND

Power-driven fabricating machinery constitutes a primary cause of industrial accidents through crippling or severance of the hands or fingers of the human operators. Barrier type guards have been only partially successful in safeguarding workers, because they can frequently be made inoperative in various rather obvious ways, or cannot be used at all where the work pieces in manufacture require a clear path into and out of the machine operating region. Moreover, work pieces frequently require worker operations thereon while the pieces are set up in working position, under which conditions barriers hinder the operators or sometimes actually contribute a separate hazard to the fabrication operation. Besides, material barriers and their supports are expensive in both first cost and maintenance.

Power cut-offs operational by particular worker body positioning, as by standing on a treadle pad or the like, are not entirely satisfactory, because they are too remote from the worker's hands to provide adequate safeguarding thereof and, besides, can be made inoperative by resting a medium or heavy weight load thereon, thus effectively eliminating the necessary condition of an operator's body location in a restricted safe region.

The objectives of this invention are to provide a relatively inexpensive machine operator safety mechanism, the actuators of which can be worn unobtrusively on the body members most likely to suffer injury without impairing operator mobility and without obstructing free passage of, and working manipulations on, work pieces incident to fabrication, and which cannot be made inoperative by the willful acts of the employees themselves.

DRAWINGS

The following drawings constitute part of this specification, in which:

FIG. 5 is a schematic circuit diagram of a preferred design of IF amplifier and detector utilized in the proximity receiver of FIG. 2, FIGS. 5A and 5B are schematic diagrams of the two transformer couplings utilized in the apparatus of FIG. 5.

DETAILED DESCRIPTION

General

Figure 1:
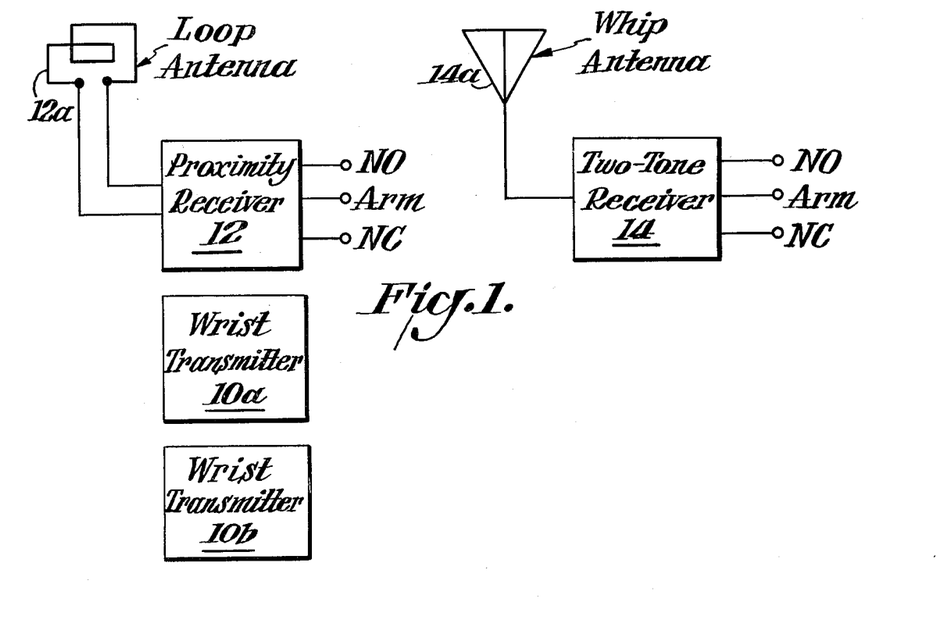
FIG. 1 is a block diagram of the apparatus of this invention.

Referring to FIG. 1, the apparatus of this invention comprises two substantially identical small, lightweight, battery-powered, rugged wrist radio transmitters 10a and 10b adapted to be individually worn in wrist watch fashion on the two wrists of the human operator and a pair of completely separate radio receiver means responsive to the broadcast signals from transmitters 10a and 10b. One of these receiver means, denoted 12 in FIG. 1, is a proximity detector provided with a loop antenna 12a generally circumscribing the entrance path to the hazardous work-performing region of the machine to be safeguarded (not shown). The other receiver means, 14, hereinafter called a "two-tone receiver", is provided with whip antenna 14a mounted generally centrally of and adjacent the safeguarded machine. The function of proximity detector receiver means 12 is to immediately deactivate the fabrication machine whenever either or both of the human operator's hands intrudes upon the machine region, presenting a likelihood of injury as a result of machine operation. The function of the two-tone receiver means 14 is to immediately deactivate the fabrication machine whenever this receiver means verifies that one or both of the wrist radio transmitters 10a or 10b is non-functioning or missing from the operator's wrist under the condition of operator approach within a preselected radius of antenna 14a, typically 15 feet. Each receiver means is shown as provided with three operating signal output leads denoted, respectively, NO (normally open circuit), ARM (relay armature) and NC (normally closed circuit) which together control the fabrication machine operation as hereinafter detailed.

Figure 2:
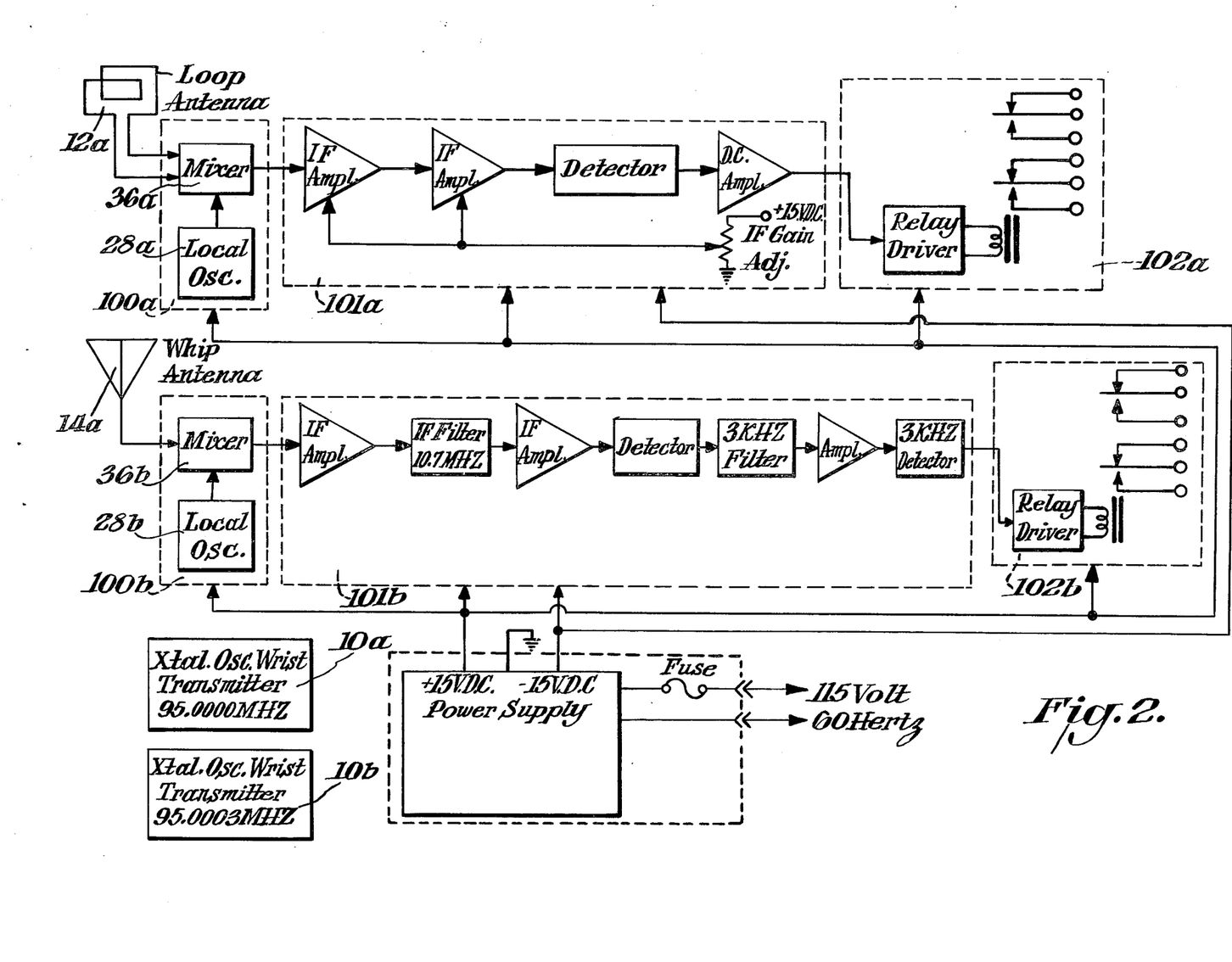
FIG. 2 is a functional block diagram of a preferred embodiment of this invention.

Referring to FIG. 2, which is a functional block diagram of a preferred embodiment of my invention, the subcircuits thereof are indicated by broken line enclosures which are conveniently detailed in later separate FIGURES.

The Transmitters

Figure 3:
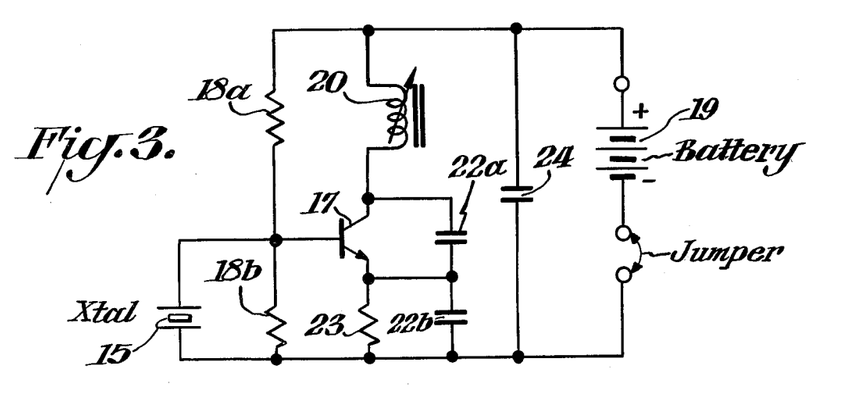
FIG. 3 is a schematic circuit diagram of a preferred design of wrist radio transmitter.

Referring to FIG. 3, which shows the identical design of both radio transmitters, transmitters 10a and 10b are preferably rugged battery-powered, highly precise quartz crystal-stabilized oscillator types incorporating AT cut crystals 15, 5th overtone series resonance, with the crystals ground to give specific frequencies of the order of 3 kilohertz apart within an 88 to 108 megahertz frequency band. This frequency range corresponds to the conventional FM broadcast band. Since the DC power input of my apparatus is only about 20 milliwatts, there is practically no likelihood that this will constitute any interference with other neighborhood communications equipment.

Thus, wrist transmitter 10a can typically broadcast at 95.000 MHz, whereas wrist transmitter 10b can typically broadcast at 95.003 MHz. The active element of the wrist transmitters 10a and 10b can be a type 2N918 NPN transistor 17 capable of amplification at frequencies as high as several hundred megahertz. The base of transistor 17 is connected to a voltage divider consisting of two 5.6 kilohm resistors 18a and 18b connected as shown with the battery 19, typically a 3 nickel-cadmium cell type of 50 ma hour capacity. This biases the base positive with respect to the emitter, causing a 5.0 ma current to flow in the collector circuit. The inductor 20 (typically 6 turns of No. 22 wire close wound on a ⅛ inch form) in series with the collector of transistor 17 is adjustable by means of a powdered iron core in the coil form upon which it is wound. It is adjusted to resonate with the stray capacity of the circuit to form a parallel resonant circuit at the operating frequency. Such a parallel resonant circuit presents a high impedance at resonance, and it is across this high impedance that most of the RF energy generated by the oscillator appears. The coil 20 radiates sufficient energy for reliable system operation without any external antenna.

The capacitive divider, consisting of capacitor 22a (typically 2.0 picofarad) and capacitor 22b (typically 4.7 pf) in series in the feedback circuit couples some of the output energy back into the emitter circuit. This feedback energy develops across resistor 23 (typically 220 ohms) in the emitter circuit of transistor 17.

The transmitter 10a, 10b circuit configurations are that of a common base amplifier with positive feedback provided by the capacitive divider, which will oscillate whenever the amplifier gain equals or exceeds the loss in the feedback circuit. The quartz crystal 15, connected from the base to signal common, is essentially a very high "Q" series resonant circuit, which presents a very low impedance at the series resonant frequency. This causes the common base amplifier to have a maximum gain at the series resonant frequency of crystal 15 and, therefore, it is at this frequency that oscillations occur. Capacitor 24 (typically 0.01 microfarad) is connected across battery 19 as a signal bypass to prevent signal current from flowing through the battery.

Battery 19, consisting of 3 Ni-Cd cells connected in series, has a total nominal output voltage of approximately 3.9 volts and a 50 milliampere-hour rating. In service, the batteries are considered discharged when the output voltage reaches 1.0 v/cell, or 3 v. total output voltage. The 50 ma-hour rating is for a one-hour discharge time at 50 ma. However, in this application, the discharge current is only 5 ma, making the battery capacity significantly greater than the 50 ma-hour rating. Under normal conditions, more than 1000 charge-discharge cycles can be anticipated for battery 19.

The Oscillator-Mixer Circuits

Figure 4:
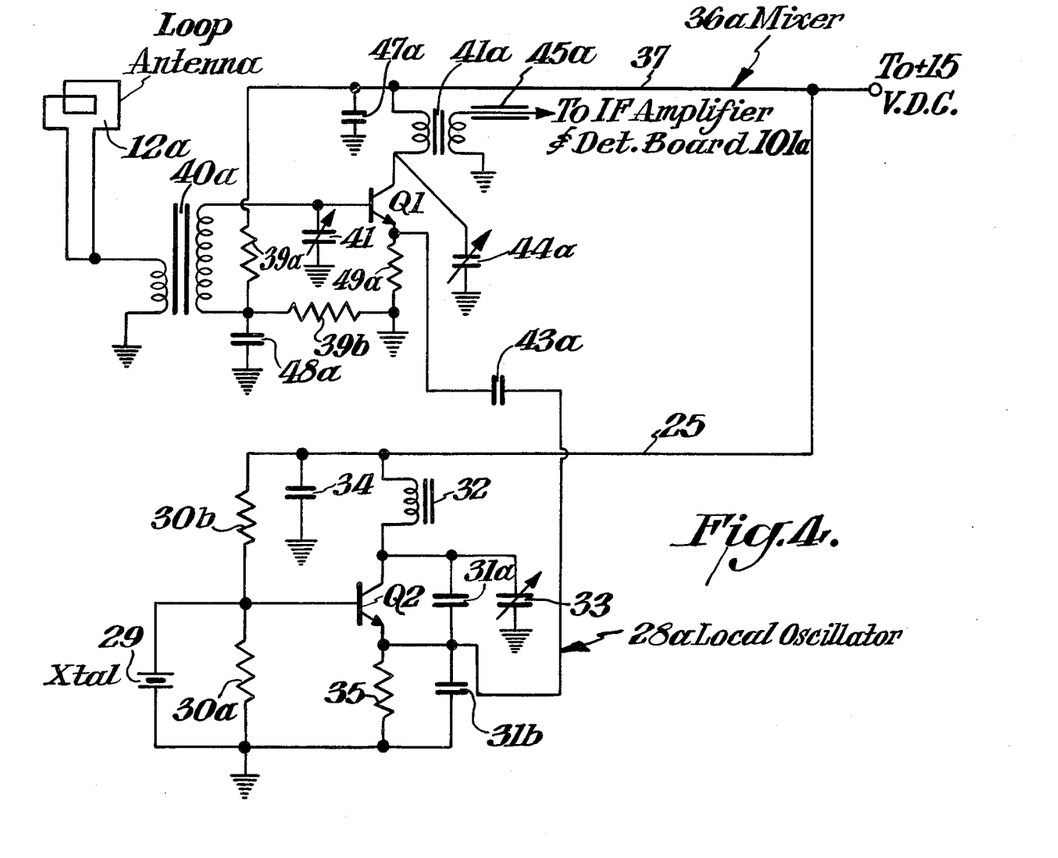
FIG. 4 is a schematic circuit diagram of a preferred design of local oscillator-mixer for both receivers of the apparatus of FIG. 2, FIGS. 4A and 4B are schematic diagrams of the two transformer couplings utilized in the apparatus of FIG. 4.

Referring to FIG. 4, the oscillator-mixer circuits 100a and 100b of FIG. 2 can be substantially identical for both receiver means 12 and 14, the specific circuit for receiver 12 being herein detailed. The purpose of circuits 100a and 100b is to convert the 95 megahertz signal received from wrist transmitter 10a (or 10b, or 10a + 10b), for example, to a 10.7 megahertz intermediate frequency for further amplification and processing. The 10.7 MHz intermediate frequency was chosen because this conforms to standard FM broadcast receiver practice, thereby making it possible to obtain large-market cost advantages in the procurement of circuit components. This is accomplished by generating a signal at 84.3 megahertz in a local oscillator 28a and mixing it with the 95 megahertz broadcast signal from wrist transmitter 10a to generate the difference frequency of 10.7 megahertz.

The local oscillator which generates the 84.3 megahertz signal embodies crystal 29, which can be identical with crystal 15, FIG. 3, i.e., an AT cut, 5th overtone series-resonant type, and comprises transistor $Q_2$ (typically a silicon NPN-Type 2N918) and its associated circuitry. Operation is similar to that of transmitters 10a and 10b hereinbefore described. The bias divider, consisting of resistors 30a (typically 5600 ohms) and 30b (typically 12,000 ohms), sets the DC operating point of transistor $Q_2$, and the capacitive divider, consisting of capacitors 31a (typically 4.7 pf) and 31b (typically 10 pf), provides the necessary RF feedback. The inductor 32 is, in this case, fixed in inductance, consisting of, typically, 20 turns of No. 28 wire wound on a toroidal powdered iron form to minimize radiation from the coil. Tuning is accomplished by variable capacitor 33 (typical range 0.8 to 10 pf) rather than employing an adjustable powdered iron core as in the wrist transmitters 10a and 10b. Capacitor 34 is preferably a ceramic type (typically 0.01 μf) the function of which is to bypass the +15 volt DC power supply line 25, thereby removing any RF components. Resistor 35 (typically a composition type 220 ohms) fixes the emitter potential above ground, in order to effect feedback return.

Figure 4A:
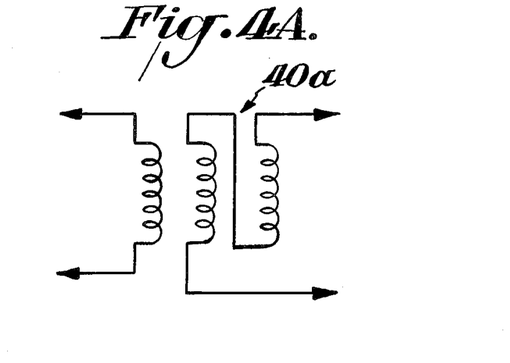

The mixer circuit, 36a, comprises transistor $Q_1$ (typically a silicon NPN-Type 2N918) and its associated circuitry. Resistors 39a (typically 200 Kohms) and 39b (typically 10 Kohms) form a voltage divider which sets the DC operating point of $Q_1$ into the square law region of its transfer characteristic to assure good mixing action. The transformer 40a is preferably an 8 turn bifilar type wound No. 28 wire, as detailed in FIG. 4A, wound on a T30-0 toroid, marketed by Micrometals, Inc., performing an impedance matching function between antenna 12a and transistor $Q_1$. Variable capacitor 41 is a trimmer capacitor (typical range 0.8 to 10 pf) which adjusts transformer 40a to compensate for different antenna configurations and different cable lengths.

Figure 4B:
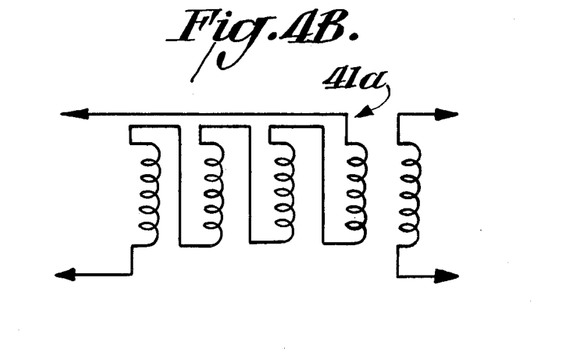

The 84.3 megahertz local oscillator 28a signal is coupled through capacitor 43a (typically a mica 3 pf type) to the emitter of $Q_1$ where it is mixed with the nominal 95 megahertz ( i.e., inclusive of both the 95 and 95.003 MHz inputs) signal appearing at the base, thereby forming the nominal 10.7 megahertz (difference) intermediate frequency. The 10.7 megahertz difference signal appears at the collector of $Q_1$ across the transformer 41a which, typically, has the design of FIG. 4B, consisting of 14 turns of bifilar No. 30 wire wound on a T37-2 toroid (Micrometals, Inc.). Transformer 41a, together with adjustable capacitor 44a (typically, range 0.8 to 10 pf) forms a parallel resonant circuit at the intermediate frequency. The signal is then coupled from the secondary of 41a through a short coaxial cable 45a to the IF amplifier and detector board 101a (proximity receiver) or 101b (two-tone receiver) of FIG. 2. Capacitor 47a (typically a ceramic disc 0.01 μf type) is a bypass capacitor for any RF signal on the +15 v. DC supply line 37, whereas resistor 49a (typically a 220 ohm composition type) fixes the emitter potential of transistor $Q_1$ above ground to permit heterodyning with the signal from transistor $Q_2$.

The IF Amplifier and Detector Circuits

Figures 5, 5A, 5B:
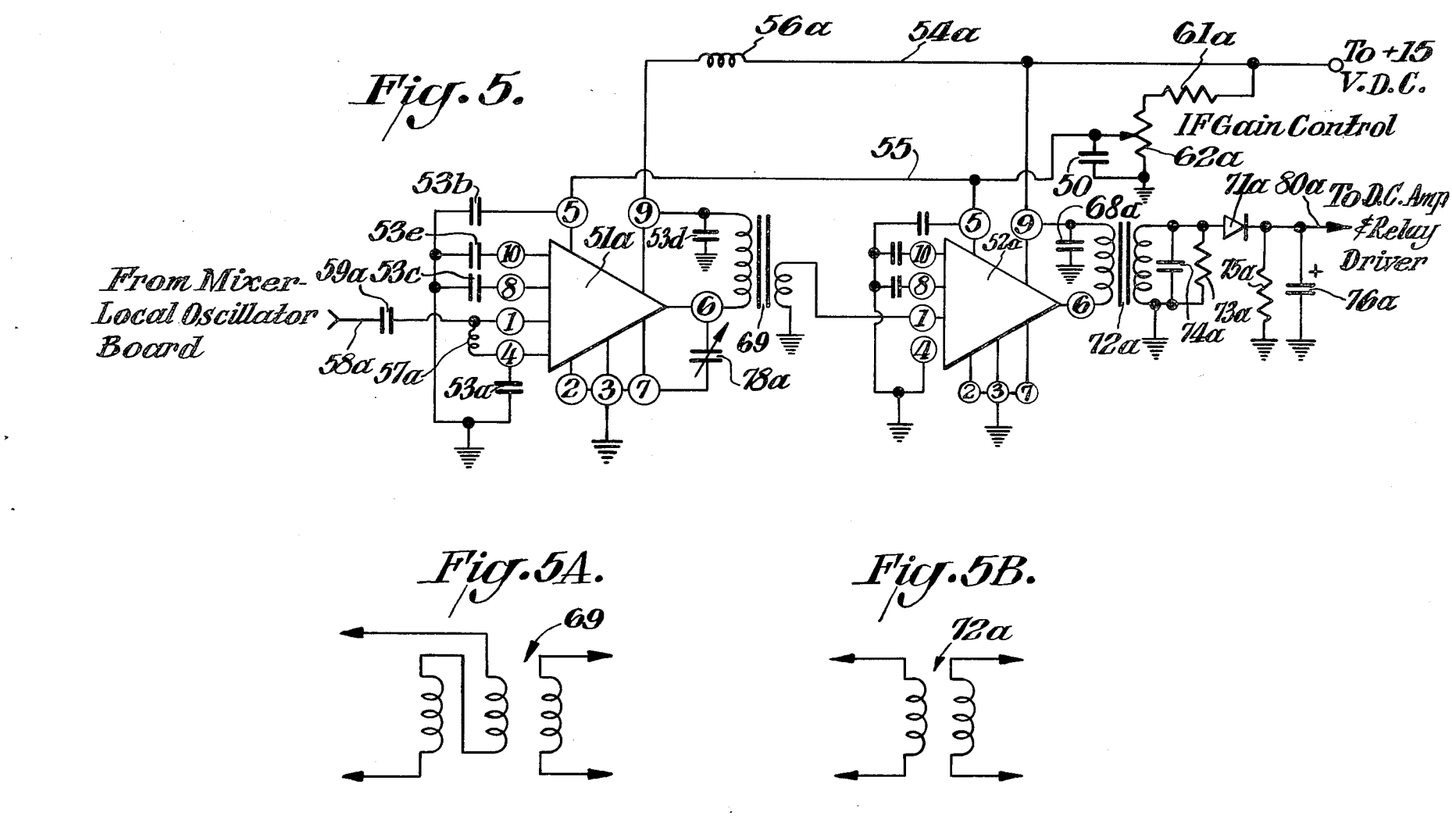
Figure 6:
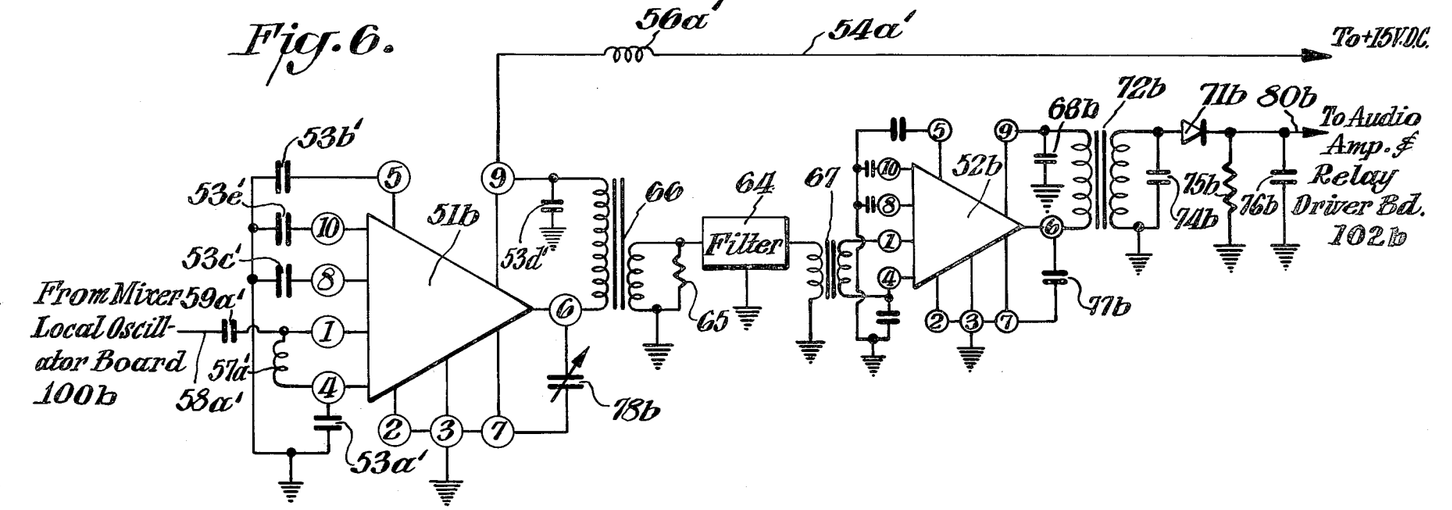
FIG. 6 is a schematic circuit diagram of a preferred design of IF amplifier and detector utilized in the two-tone receiver of FIG. 2, FIGS. 6A, 6B and 6C are schematic diagrams of the three transformer couplings utilized in the apparatus of FIG. 6.

The IF amplifier and detector circuit 101a (FIG. 2) used in proximity receiver 12 is shown in FIG. 5, whereas that of two-tone receiver 14, 101b, is shown in FIG. 6. Each receiver uses two stages of intermediate frequency amplification, provided by the two integrated circuit amplifiers 51a, 52a and 51b, 52b, respectively, which can typically be Motorola MC1550G designs. The MC1550 is an integrated circuit linear amplifier capable of greater than 25 decibel gain at 10.7 megahertz and features monolithic fabrication techniques utilizing diffused resistors and small-geometry transistors. The input signals to these amplifiers (only 51a and 51b being detailed) are introduced via pins 1 and 4, and the output is taken from pins 6 and 9. Pins 2, 3 and 7 are connected directly to ground, whereas pins 4, 5, 8, 9 and 10 are by-passed to ground through capacitors 53a-53e and 53a'-53e' (typically, 0.01 μf types). The gains of amplifiers 51a and 52a can be varied by application of a positive DC voltage via lead 55 to pins 5. RFC choke coil 56a (and 56a') (typically, 100 μh value) are interposed in leads 54a (54a') to decouple any RF signal appearing here, whereas RFC choke coils 57a (57a') (typically 22 μh) are connected with input lead 58a (58a') coupled via capacitor 59a (59a') (typically ceramic 0.01 μf types).

Varying the voltage applied to pins 5 permits adjustment of the receiver gain. Resistor 61a, typically, 5600 ohms, and potentiometer 62a, typically 10 Kohms, constitute a voltage divider from the +15 v line to ground. Capacitor 50 (typically a ceramic 0.01 μf type) is a by-pass capacitor for any RF signal on the +15 v DC supply line 54a. Zero to appoximately 10 volts is available at the tap of 62a, depending on the setting of the potentiometer. This voltage is applied to pins 5 of both of the amplifiers 51a and 52a, providing a receiver gain adjustment of greater than 30 decibels. No gain adjustment is provided for the two-tone receiver 14, since that receiver is always operated at maximum sensitivity.

Although the circuits of FIGS. 5 and 6 perform similar functions, namely, amplifying and detecting the 10.7 megahertz IF signal, there are important circuit differences. Thus, two-tone receiver 14 is considerably more selective than proximity receiver 12.

Figure 6A:
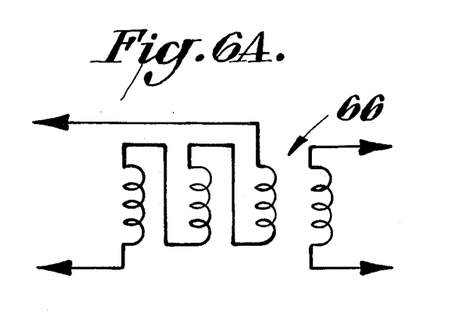
Figure 6B:
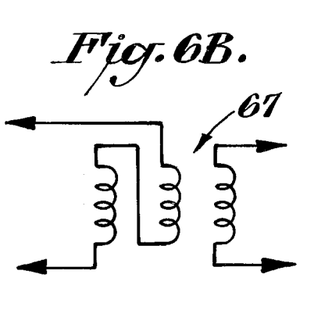

This selectivity is obtained by use of a selective filter 64 (typically a Network Sciences L0109, 10.7 MHz) between amplifiers 51b and 52b of FIG. 6. This filter requires a 330 ohm termination on both its input and output in order to assure proper bandpass characteristics. The input termination is provided by resistor 65, typically 330 ohms. The transformer 66, typically 15 turns bifilar wound No. 28 wire on a T37-2 toroid (Micrometals, Inc.), detailed in FIG. 6A, performs a matching function by transforming the 330 ohms through a 3 to 1 turns ratio (i.e., a 9 to 1 impedance ratio), so that the output load of amplifier 51b is approximately 3000 ohms. The 330 ohm termination on the output of filter 64 is provided by transformer 67, typically 20 turns bifilar wound No. 28 wire on a T37-2 toroid (Micrometals, Inc.), detailed in FIG. 6B. Transformer 67 transforms the input impedance (approximately 1300 ohms) of amplifier 52b through a 2:1 turns ratio (4:1 impedance ratio) to a 330 ohm load required by filter 64.

In the proximity receiver 12, where no additional selectivity is required, a single transformer 69 [typically 20 turns bifilar wound No. 30 wire on a T37-2 toroid core (Micrometals, Inc.), detailed in FIG. 5A] provides the matching function between amplifiers 51a and 52a. It will be understood that the detector output of the proximity receiver (FIG. 5) is a DC level, whereas the detector output of the two-tone receiver (FIG. 6) is a 3000 hertz tone.

Figure 6C:
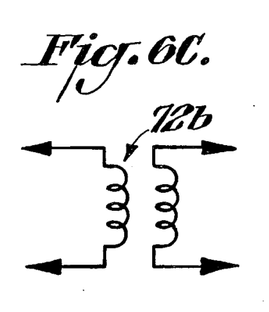

In both receivers the outputs of the second amplifiers, 52a and 52b, respectively, are coupled to the diode detectors 71a and 71b (typically germanium 1N34 types) through, respectively, transformer 72a, typically 23 turns bifilar No. 30 wire wound on a T37-2 toroid (Micrometals, Inc.), detailed in FIG. 5B, and transformer 72b, typically 17 turns bifilar wire wound on a T37-2 toroid (Micrometals, Inc.), detailed in FIG. 6C, each having a 1:1 turns ratio. Capacitors 68a and 68b, typically disc ceramic 0.01 μf types, are bypasses decoupling the + 15 v. line 54a.

The several pins of amplifiers 52a and 52b of FIGS. 5 and 6, respectively, are provided with capacitor networks identical with those of amplifiers 51a and 51b, respectively, and are therefore not further described herein. Resistor 73a (typically 15 Kohm size) connected in parallel with capacitor 74a, typically a ceramic 47 pf size, constitute a load applicable to transformer 72a. Resistors 75a, typically 15 Kohm size, and 75b, typically a one Kohm size, connected in parallel with capacitors 76a (typically a tantalum 10 μf size) and 76b (typically a ceramic 0.01 μf type), respectively, are grounded output filters removing any 10.7 IF from the output signal. Capacitors 74a (hereinabove mentioned) and 74b (typically a ceramic 100 pf type) connected to ground across the secondaries of transformers 72a and 72b, respectively, are 10.7 megahertz tuning capacitors. Finally, capacitors 78a (typically, variable 5 to 25 pf), 78b (typically, variable 0.8 to 10 pf) and 77b (typically, a disc ceramic 22 pf type) connected in shunt across pins 6 and 7 of amplifiers 51a, 51b and 52b, respectively, are tuning trimmers for transformers 69, 66 and 72b, respectively.

Figure 7:
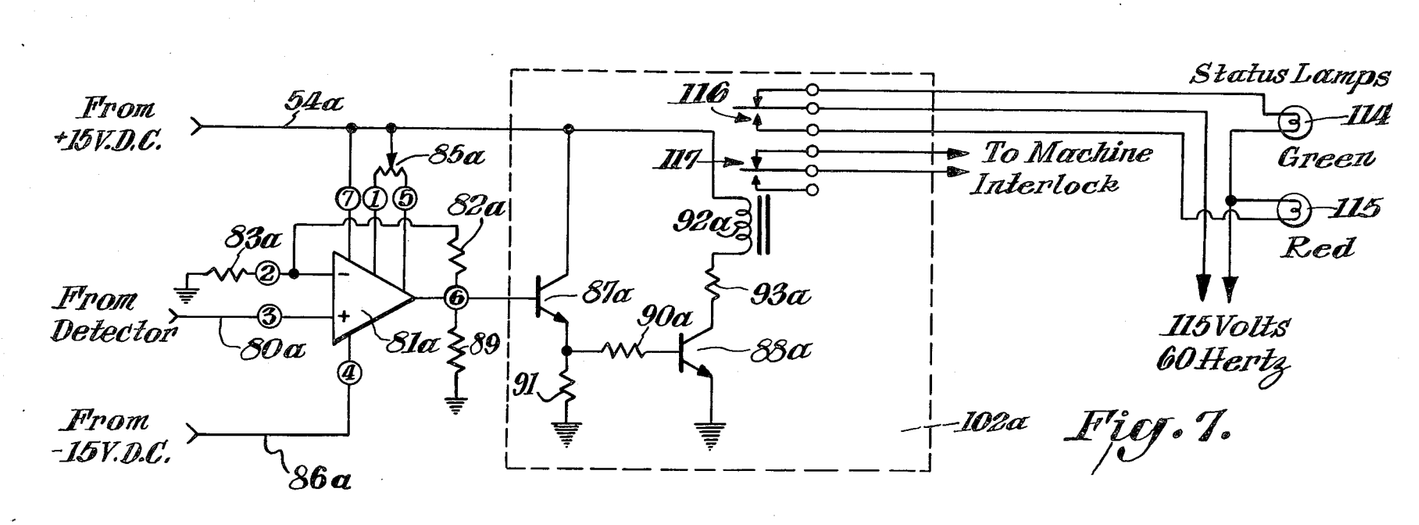
FIG. 7 is a schematic circuit diagram of the DC amplifier and relay driver of the proximity detector of FIG. 2.

Referring to FIG. 7, the output of the detector circuit of proximity receiver 12 is fed, via lead 80a, to operational DC amplifier 81a (typically a μA 740 type) and the relay driver board indicated generally at 102a. Operational amplifier 81a is a high performance monolithic FET-input linear integrated circuit (typically a Fairchild Instruments Co. design) having a high imput impedance and a low input offset current. The input signal voltage is supplied via pin 3 and the output voltage is taken off through pin 6. Feedback is supplied via resistor 82a, typically 12 Kohm, from pin 6 to pin 2 to set the amplifier gain, which is approximately the ratio of the 12 Kohm resistor 82a to the 100 ohm resistor 83a connecting pin 2 with ground which, in this case, sets the voltage gain at approximately 1200. Potentiometer 85a, typically 10 Kohms, connected between pins 1 and 5, with its arm connected to the +15 v DC supply lead 54a, is a balancing control to set the output offset voltage. Resistor 89, typically 1500 ohms size, is connected between pin 6 and ground, thereby constituting a load for operational amplifier 81a to work into. Connection via leads 86a and 86b to pins 4 of amplifiers 81a and 81b, respectively, furnish the conventional − 15 v. DC supply. The base-connected output from pin 6 drives transistor 87a (typically, a 2N3904 NPN silicon type) connected in emitter follower configuration, which, in turn, drives transistor 88a (typically a 2N5191 type) through resistor 90a (typically 220 ohms size).

The collector element of transistor 88a is connected to the +15 v DC lead 54a through relay coil 92a (typically, a Potter & Brumfield KRP5D, 12 v DC type) and resistor 93a (typically a 33 ohm, 2 watt type). Thus, when the DC signal on the base of transistor 87a increases positively from ground, the DC level at the emitter across resistor 91 (typically a 2.2 Kohm size), connected to ground, also increases, driving transistor 88a into conduction. When transistor 88a conducts, current flows through relay coil 92a and the relay contacts transfer from the normal (i.e., fabrication machine operating) position shown in FIG. 7 to its second (i.e., fabrication machine power supply disconnected) state.

If desired, circuit condition indicators can be readily incorporated in circuit with the relay contacts. Thus, referring to FIG. 7, a green incandescent lamp 114 is connected to the conventional 115 v. 60 Hz power supply via the switch arm closed on the upper contact in relay contact pair 116, whereas a red incandescent lamp 115 is connected to power via the lower contact. The lower contact pair 117, operating in unison with the upper contact pair, is reserved for connection with the machine interlock, thereby maintaining the machine power supply circuit closed whenever the switch arm is closed on the upper contact (as shown in FIG. 7) and open whenever the switch arm closes on the lower (dummy) contact.

Figure 8:
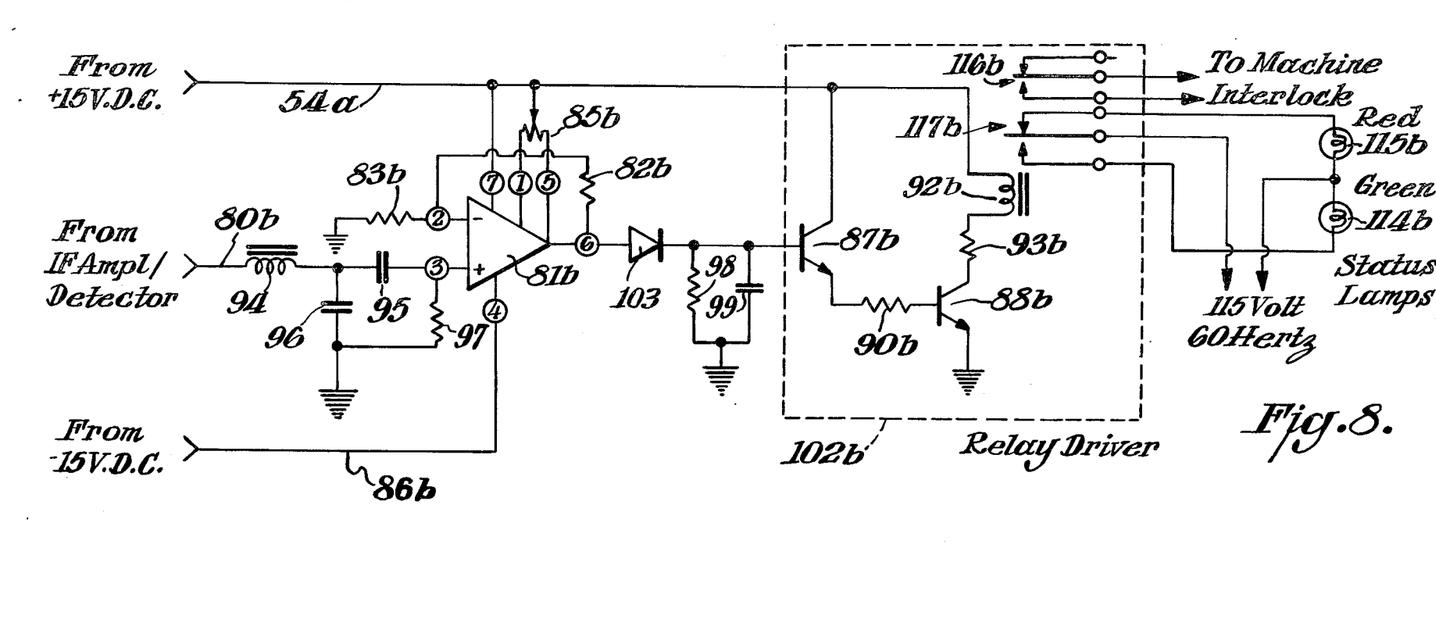
FIG. 8 is a schematic circuit diagram of the audio amplifier and relay driver of the two-tone receiver of FIG. 2.

The two-tone receiver 14 audio amplifier and driver circuit of FIG. 8 is generally similar to the amplifier and detector circuit of FIG. 7, with corresponding components denoted by the same reference numerals followed, however, by a "b" suffix, so that the description of common subject matter is not repeated. Since the input signal from the IF amplifier-detector of FIG. 6 received via lead 80b is a 3000 cycle tone, rather than DC, it is first routed through a band pass filter made up of inductor coil 94, typically a 2.5 henry UTC TF5RX2022 type, and capacitors 95 and 96, each, typically, ceramic types of 0.0018 μf and 0.001 μf size, respectively, and resistor 97, typically a 47 Kohm size. Because of the different service requirements, resistors 82b and 83b have the sizes 10 Kohms and one Kohm, respectively, as compared with their FIG. 7 counterparts, thereby setting the gain of amplifier 81b to 10.

The amplified 3000 hertz output appearing at pin 6 of amplifier 81b is rectified into DC by diode 103, typically a germanium type 1N34. The grounding resistor 98, typically 47 Kohm size, provides a DC return for diode 103, and capacitor 99, typically a tantalum 30 μf type, removes any 3 kHz signal from the DC output of interest. The relay driver 102b is identical with 102a of FIG. 7; however, the machine interlock is here connected across the switch arm and the lower (open) contact of relay contact pair 116b, whereas the red incandescent lamp 115b is connected to the usual 115 v. 60 Hz power supply via the switch arm and the upper contact in relay contact pair 117b, while the green incandescent lamp 114b is connected to power via the lower contact. Contact pairs 116b and 117b again operate in unison, as hereinbefore described for relay driver 102a; however, operating power to the guarded fabrication machine is now supplied only when there is detected the presence of both of the operator's wrist transmitters 10a and 10b, i.e., the opposite switch condition to that shown in FIG. 8.

System Performance

Figure 10:
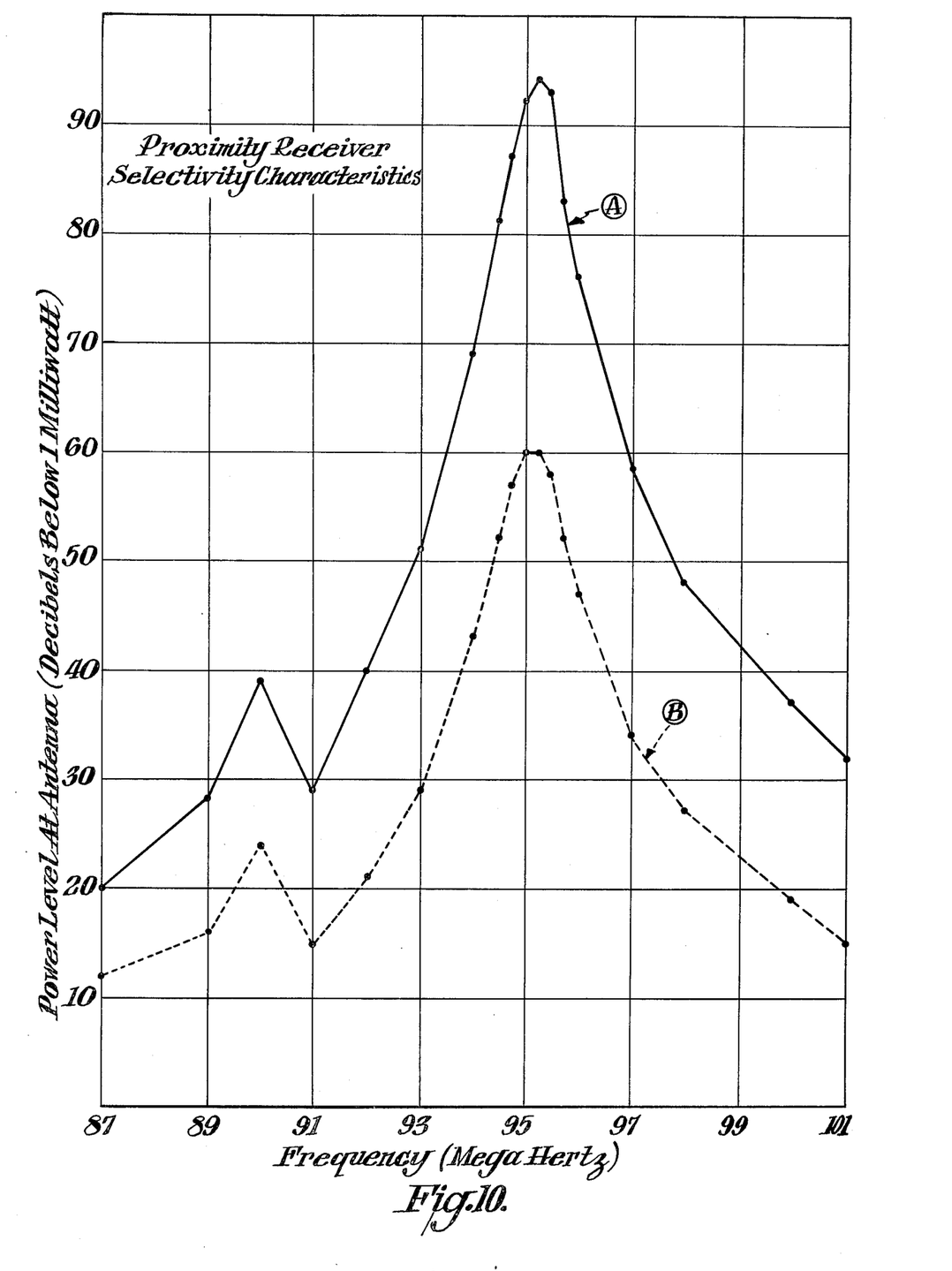
FIG. 10 is a plot of selectivity performance in terms of frequency (megahertz) v. power level at antenna (decibels below/milliwatt) for the proximity detector waveforms A and B.

FIG. 10 shows the frequency response characteristics of the proximity receiver 12 at two different settings of IF gain, A and B. The curves were generated by connecting a precision signal generator (e.g., a Hewlett-Packard Model 608C) in place of loop antenna 12a, setting the frequency and increasing the power level until the relay transferred. This was repeated for a number of frequencies, which gave the plots A and B of FIG. 10.

Curve A corresponds to the gain setting which will detect the presence of a wrist transmitter 10a or 10b approximately 3 feet, or less, from an antenna 12a. Curve B corresponds to the gain setting which will detect the presence of a wrist transmitter 10a or 10b approximately 6 inches, or less, from an antenna 12a.

It will be seen that receiver 12 exhibits essentially the same selectivity characteristics at the two different gain settings. The secondary response peak which appears at approximately 90 MHz is a spurious response which is caused by the second harmonic of the local oscillator 28a beating with the second harmonic of the input signal. This phenomenon, common to all superheterodyne receivers, produces a spurious response which appears one-half of the IF frequency away from the main response, or, in this case, 95 MHz − 10.7 MHz/2 = 89.65 MHz. If this spurious response proves troublesome, as it could in the situation where it fell on the same frequency as a strong local broadcast station, the problem can be readily eliminated by placing additional filtering in the front end of the receiver.

Figure 11:
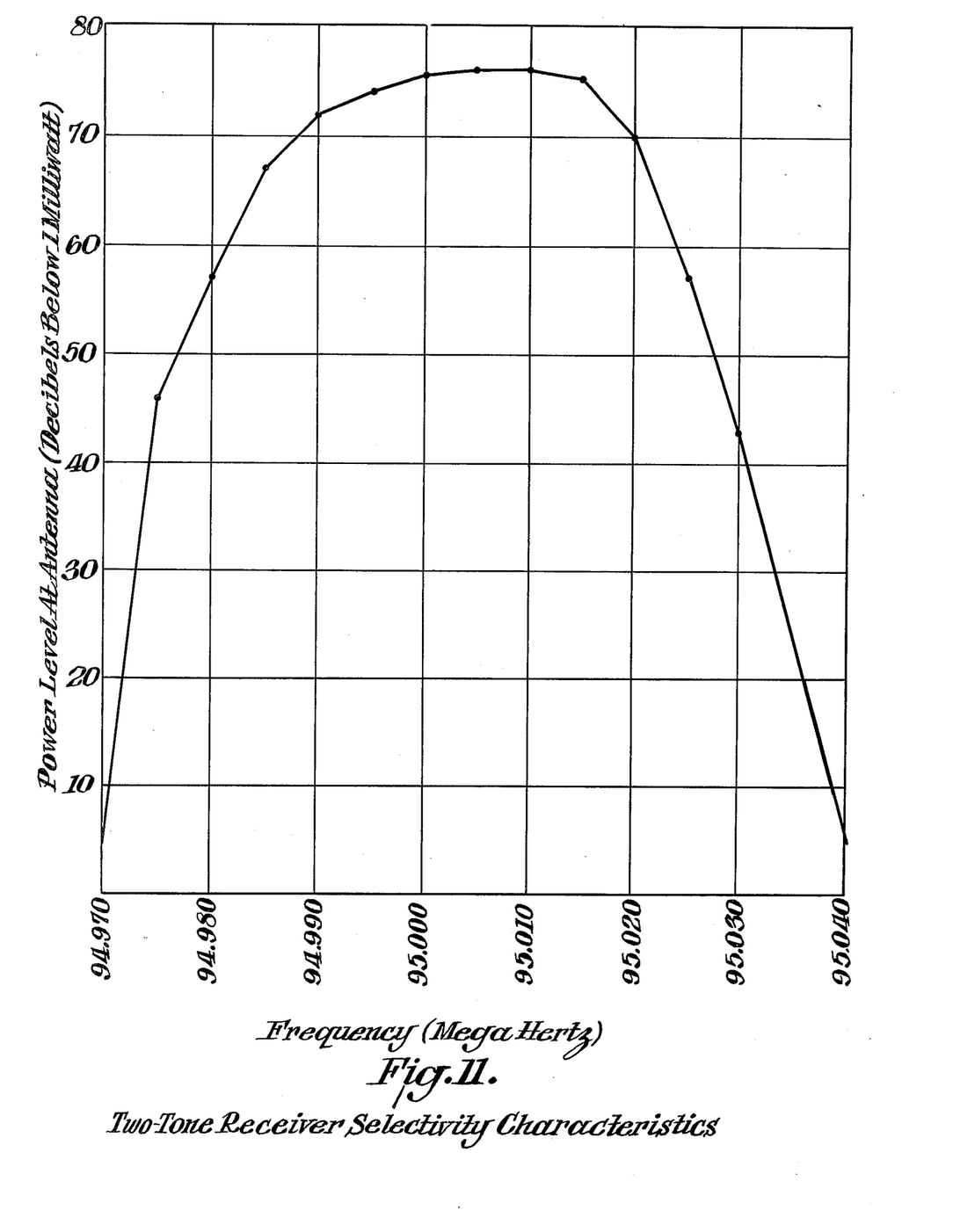
FIG. 11 is a plot of selectivity performance in terms of frequency (megahertz) v. power level at antenna (decibels below/milliwatt) for the two-tone receiver of FIG. 2 during the same equipment performance test graphically depicted for the proximity detector in FIG. 10.

Referring to FIG. 11, the frequency response curve for two-tone receiver 14 was generated in a similar manner, except that the signal generator was amplitude-modulated approximately 60% with a 3000 Hertz tone. As is clear from FIGS. 10 and 11, two-tone receiver 14 is much more selective than proximity receiver 12. This selectivity was deliberately built in by the incorporation of IF filter 64, FIG. 6, in order to prevent interference from nearby wrist transmitters operating on different frequencies. As FIG. 11 shows, signals only 30 or 40 kilohertz removed on either side of the 95 megahertz center frequency are rejected in excess of negligible power levels. Therefore, it is practicable to operate two or more safety devices according to this invention in proximity to one another without interference, provided that a minimum of about 100 kilohertz frequency spacing between units is observed.

Figures 9, 9A:
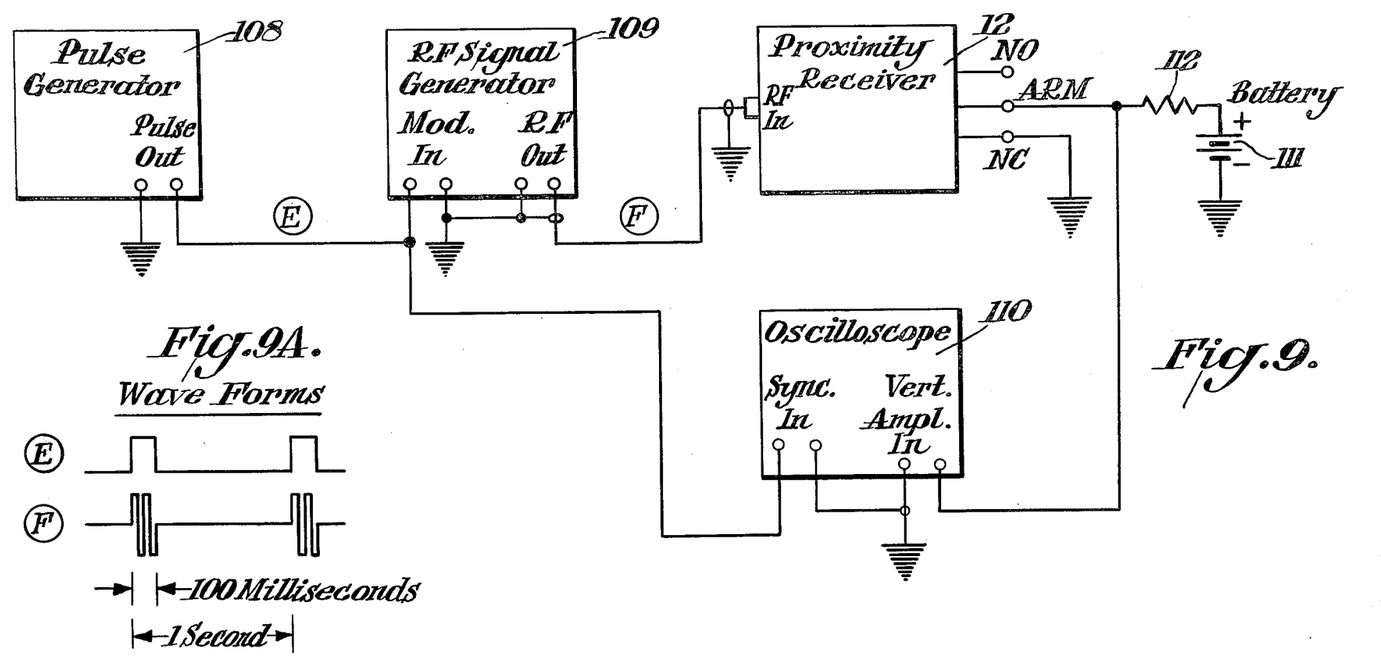
FIG. 9 is a block diagram of a turn-on time test auxiliary for the proximity detector of FIG. 2.
FIG. 9A is a schematic representation of the waveforms E and F transmitted by the apparatus of FIG. 9.

FIG. 9 shows the connection with a oscilloscope 110 with reference to an RF signal generator 109 and proximity receiver 12 to measure the turn-on delay of the proximity receiver. Thus, pulse generator 108 was adjusted to put out a 100 millisecond pulse E at a rate of one pulse/sec. (refer FIG. 9A), and this was used to modulate the RF signal generator 109 tuned to 95 megahertz. RF generator 109 thereupon put out a burst of 95 megahertz energy F of 100 milliseconds duration once per second. The RF burst F was fed into the proximity receiver 12 through a precision attenuator on signal generator 109.

Figure 9B:
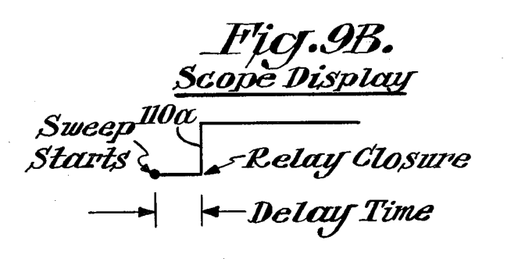
FIG. 9B is a schematic representation of the oscilloscope display for the apparatus of FIG. 9.

The leading edge of the pulse from pulse generator 109 was used to trigger the oscilloscope 110 sweep (FIG. 9B), which then started simultaneously with the application of the 95 megahertz burst to proximity receiver 12. A battery 111 was connected to the relay points 116 and 117 within proximity receiver 12 via current-limiting resistor 112 (typically, a 1000 ohm type), so that a vertical deflection 110a of the trace occurred on the oscilloscope 110 when the relay contacts closed. The RF signal strength to proximity receiver 12 was increased slowly until sufficient signal was present at the receiver front end to close the relay. The delay time was then noted between the time the oscilloscope sweep began until the relay closed, as shown in FIG. 9B. This delay time varied from a maximum of 20 milliseconds, when the RF signal level was just sufficient to close the relay, to a minimum of 12 milliseconds for further increases in RF signal strength. It is concluded, therefore, that, in the worst case, the turn-on delay of proximity receiver 12 would not exceed 25 milliseconds and, in actual service, would probably be less than 20 milliseconds.

It will be understood that the delay time of the machine interlock relay (not shown) must be added to that of relay driver 102a to establish the total delay but, since the machine interlock relay delay has been established as being no more than 150 milliseconds at the most, the total delay will be 175 milliseconds, or less. This is a very quick response time which affords complete protection against even a worker stumbling into the hazardous work-performing area.

A radio safety apparatus according to this invention has been installed on a heavy pipe flanging machine in an industrial shop which presented a particularly bad environment from the standpoint of electromagnetic disturbances. Thus, there were large electric motors, electric arc welders, including a plasma arc welding machine, and other devices in the same room. The radio safety apparatus operated satisfactorily on the pipe flanger in the course of repetitive three-minute duty cycles.

If necessary, additional noise immunity can be conferred by providing filters on the primary 115 v. 60 hertz power lines at the points of entry into each receiver 12 and 14 enclosure. Also, additional filtering can be provided on all control lines within the receiver enclosures connected to external circuits. The receivers can thereby be made "RFI-tight" by eliminating all interference conducted into the enclosures while preserving intact reception via the antennas 12a and 14a.

In any case, the effects of outside interference will always be "fail-safe" with the apparatus described, so that any interference will present itself as a machine operation impediment rather than a disabling accident.

It will be understood that an alternative embodiment of this invention can utilize pulsed signals emitted from transmitters 10a and 10b, in which event the life of battery 19, FIG. 3, will be extended approximately three to four times over that of the design described supra. This would involve some changes in the receiver circuitry; however, the alterations would be straightforward.

What is claimed is:

1. A radio-controlled machine power safety cut-off comprising
   a pair of battery-powered radio transmitters adapted for individual wear on the wrists of the machine operator,
   a first radio receiver means having its antenna disposed at a danger zone of said machine responsive to the predetermined magnitude of a broadcast signal emitted by either or both of said radio transmitters signalling intrusion of said radio transmitters closer than a preselected safe distance, said first radio receiver being provided with associated switching means cutting off the operating power of said machine, upon occurrence of said intrusion, and
   a second radio receiver means having its antenna disposed adjacent said machine responsive to the broadcast signals of said pair of radio transmitters, said second radio receiver being provided with associated switching means cutting off the operating power to said machine whenever either or both of said radio transmitters fails to emit said broadcast signals.

2. A radio-controlled machine safety power cut-off according to claim 1 wherein at least said first radio receiver means is provided with gain control means.

3. A radio-controlled machine safety power cut-off according to claim 1 wherein said radio receiver means are provided with means indicating the closed circuit and open circuit conditions of said associated switching means effecting said cutting off of the operating power of said machine.

4. A radio-controlled machine safety power cut-off according to claim 1 wherein said pair of radio transmitters each broadcasts a different preselected radio frequency signal, the difference in frequency between which constitutes the distinctive operating frequency signal for said second radio receiver means.

5. A radio-controlled machine safety power cut-off according to claim 4 wherein said pair of radio transmitters comprise quartz crystal-stablized oscillators.

6. A radio-controlled machine safety power cut-off according to claim 5 wherein said first and said second radio receiver means are each provided with its own oscillator and mixer generating, upon receipt of broadcast signals from said radio transmitters, a preselected heterodyne frequency signal determining said cut-off of operating power to said machine.

* * * * *